US012646840B2

(12) United States Patent
Neenan et al.

(10) Patent No.: US 12,646,840 B2
(45) Date of Patent: Jun. 2, 2026

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); Rauhon Ahmed Shaik, Wylie, TX (US); George Alexander Bednekoff, Plano, TX (US)

(73) Assignee: Parsec Technologies, Inc., Plano, TX (US)

( * ) Notice: Subject to any disclaimer, the term of this patent is extended or adjusted under 35 U.S.C. 154(b) by 0 days.

(21) Appl. No.: 18/893,344

(22) Filed: Sep. 23, 2024

(65) Prior Publication Data

US 2025/0233307 A1 Jul. 17, 2025

Related U.S. Application Data

(60) Provisional application No. 63/585,194, filed on Sep. 25, 2023.

(51) Int. Cl.

| | |
|---|---|
| ***H01Q 5/371*** | (2015.01) |
| ***H01Q 1/42*** | (2006.01) |
| ***H01Q 1/48*** | (2006.01) |
| ***H01Q 5/307*** | (2015.01) |
| ***H01Q 5/378*** | (2015.01) |
| ***H01Q 9/16*** | (2006.01) |

(52) U.S. Cl.

CPC ............... *H01Q 5/378* (2015.01); *H01Q 1/42* (2013.01); *H01Q 1/48* (2013.01); *H01Q 5/307* (2015.01); *H01Q 9/16* (2013.01)

(58) Field of Classification Search

CPC ........ H01Q 5/378; H01Q 5/307; H01Q 5/371; H01Q 1/42; H01Q 1/48; H01Q 9/16; H01Q 9/285; H01Q 21/28

See application file for complete search history.

(56) References Cited

U.S. PATENT DOCUMENTS

| | | | |
|---|---|---|---|
| 5,966,102 | A | 10/1999 | Runyon |
| 6,067,053 | A | 5/2000 | Runyon |
| 6,111,550 | A | 8/2000 | Miller et al. |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Awat M Salih

(74) *Attorney, Agent, or Firm* — Knobbe, Martens, Olson & Bear, LLP

(57) ABSTRACT

An antenna assembly may include at least two PCB bases. Each PCB base may include a first multi-band antenna element, and a second multi-band antenna element, formed on each PCB base. The first multi-band antenna element and the second multi-band antenna elements can include one or more low-band radiating elements, one or more mid-band radiating elements; and one or more high-band radiating elements.

21 Claims, 10 Drawing Sheets

(56) References Cited

U.S. PATENT DOCUMENTS

| | | | | |
|---|---|---|---|---|
| 9,379,453 | B2 | 6/2016 | Rentz | |
| 10,224,615 | B2 | 3/2019 | Wu | |
| 10,312,583 | B2 | 6/2019 | Ng | |
| 10,403,978 | B2 * | 9/2019 | Zimmerman | H01Q 5/48 |
| 11,251,539 | B2 | 2/2022 | Hinman | |
| 11,283,149 | B2 | 3/2022 | Neenan et al. | |
| 11,329,363 | B1 | 5/2022 | Neenan et al. | |
| 11,563,278 | B2 * | 1/2023 | Tang | H01Q 5/48 |
| 11,658,382 | B2 | 5/2023 | Neenan et al. | |
| 11,664,574 | B2 | 5/2023 | Neenan et al. | |
| 11,909,090 | B2 | 2/2024 | Neenan et al. | |
| 11,936,094 | B2 | 3/2024 | Neenan et al. | |
| 12,057,641 | B2 | 8/2024 | Neenan et al. | |
| 12,212,035 | B2 | 1/2025 | Neenan et al. | |
| 12,266,845 | B2 | 4/2025 | Neenan et al. | |
| 2010/0253584 | A1 | 10/2010 | Yang et al. | |
| 2011/0080323 | A1 | 4/2011 | Thiam | |
| 2011/0102278 | A1 | 5/2011 | Rozan | |
| 2012/0127051 | A1 * | 5/2012 | Chiu | H01Q 9/285 343/814 |
| 2012/0146872 | A1 | 6/2012 | Chainon et al. | |
| 2012/0280882 | A1 | 11/2012 | Zimmerman | |
| 2014/0139387 | A1 | 5/2014 | Jones et al. | |
| 2014/0375507 | A1 | 12/2014 | Lin et al. | |
| 2015/0042521 | A1 | 2/2015 | Hazen | |
| 2015/0102974 | A1 | 4/2015 | Stoytchev et al. | |
| 2016/0172750 | A1 | 6/2016 | Ng | |
| 2016/0240933 | A1 * | 8/2016 | Wu | H01Q 5/40 |
| 2016/0248148 | A1 | 8/2016 | Hill et al. | |
| 2016/0277062 | A1 | 9/2016 | Cheon et al. | |
| 2016/0285161 | A1 * | 9/2016 | Apaydin | H01Q 1/521 |
| 2017/0062952 | A1 | 3/2017 | Sundararajan | |
| 2017/0237158 | A1 | 8/2017 | Gibson et al. | |
| 2017/0317428 | A1 | 11/2017 | Petropoulos | |
| 2017/0324171 | A1 | 11/2017 | Shehan | |
| 2017/0358842 | A1 | 12/2017 | Shehan | |
| 2018/0062731 | A1 | 3/2018 | Ng et al. | |
| 2018/0083348 | A1 | 3/2018 | Thiam et al. | |
| 2018/0109006 | A1 | 4/2018 | Ng et al. | |
| 2018/0323513 | A1 | 11/2018 | Varnoosfaderani et al. | |
| 2019/0148825 | A1 | 5/2019 | Huerta et al. | |
| 2019/0237850 | A1 | 8/2019 | Fleischer et al. | |
| 2019/0305406 | A1 | 10/2019 | Williams | |
| 2019/0341674 | A1 | 11/2019 | Rosenthal et al. | |
| 2019/0356051 | A1 | 11/2019 | Barrera et al. | |
| 2020/0112101 | A1 | 4/2020 | Yun | |
| 2020/0350664 | A1 | 11/2020 | Thill | |
| 2020/0373668 | A1 * | 11/2020 | Wu | H01Q 9/285 |
| 2020/0411972 | A1 | 12/2020 | Hicks et al. | |
| 2021/0305718 | A1 | 9/2021 | Li | |
| 2021/0391655 | A1 | 12/2021 | Brobston et al. | |
| 2022/0384966 | A1 | 12/2022 | Chiang et al. | |
| 2023/0145053 | A1 | 5/2023 | Kilbury et al. | |
| 2023/0223709 | A1 | 7/2023 | Guntupalli | |
| 2024/0097339 | A1 | 3/2024 | Khatua | |
| 2024/0113450 | A1 | 4/2024 | Neenan et al. | |
| 2024/0113451 | A1 | 4/2024 | Neenan et al. | |
| 2024/0128644 | A1 | 4/2024 | Neenan et al. | |
| 2024/0304958 | A1 | 9/2024 | Matsumura | |
| 2025/0079683 | A1 | 3/2025 | Neenan et al. | |
| 2025/0079704 | A1 | 3/2025 | Neenan et al. | |
| 2025/0087905 | A1 | 3/2025 | Neenan et al. | |
| 2025/0105530 | A1 | 3/2025 | Neenan et al. | |
| 2025/0158281 | A1 | 5/2025 | Neenan et al. | |
| 2025/0158289 | A1 | 5/2025 | Neenan et al. | |
| 2025/0167445 | A1 | 5/2025 | Neenan et al. | |
| 2025/0167459 | A1 | 5/2025 | Neenan et al. | |
| 2025/0233306 | A1 | 7/2025 | Neenan et al. | |
| 2025/0260160 | A1 | 8/2025 | Neenan et al. | |

FOREIGN PATENT DOCUMENTS

| | | | |
|---|---|---|---|
| CN | 203562507 | | 4/2014 |
| CN | 105281049 | | 1/2016 |
| CN | 108777357 | * | 11/2018 |
| CN | 210806018 | | 6/2020 |
| CN | 212303910 | | 1/2021 |
| CN | 114465021 | | 5/2022 |
| CN | 116151285 | | 5/2023 |
| DE | 202017002307 U1 | | 8/2017 |
| EP | 0 349 499 | | 1/1990 |
| EP | 3 474 376 | | 4/2019 |
| EP | 3 614 491 | | 2/2020 |
| KR | 102260880 | | 6/2021 |
| WO | WO2005062422 | * | 7/2005 |
| WO | WO 2013/090783 | | 6/2013 |
| WO | WO 2018/140305 | | 8/2018 |
| WO | WO 2020/010039 | | 1/2020 |
| WO | WO 2023/128683 | | 7/2023 |
| WO | WO 2024/035801 | | 2/2024 |
| WO | WO 2024/035805 | | 2/2024 |
| WO | WO 2024/035810 | | 2/2024 |
| WO | WO 2025/072367 | | 9/2024 |
| WO | WO 2025/072213 | | 4/2025 |
| WO | WO 2025/072553 | | 4/2025 |

* cited by examiner

ANTENNA SYSTEMS

INCORPORATION BY REFERENCE TO ANY PRIORITY APPLICATIONS

The present application claims priority benefit to U.S. Provisional Application No. 63/585,194, filed Sep. 25, 2023, entitled "ANTENNA SYSTEMS," which is hereby incorporated by reference herein in its entirety. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, 3GPP as a collaborative organization has developed protocols for mobile telecommunications. The latest operational standard is known as 5G. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennas that are configured to electromagnetically resonate at frequencies within the dedicated bandwidth. As more wireless devices are used on a frequency bandwidth, a communication bottleneck occurs as wireless devices compete for frequency channels within a dedicated bandwidth. 3GPP frequency bands range from 450 MHz to 8 GHz and beyond, however, antennas configured to resonate within this spectrum only resonate below 8 GHz for mobile 3GPP telecommunication standards. To capture a greater portion of the 3GPP or other telecommunication spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems. This may result in a system with poor functionality and/or coverage.

SUMMARY

This disclosure relates to antennas that cover multiple frequency bands that are prolific in today's telecommunication wireless spectrum. The advances of telecommunications wireless devices have expanded the number of frequency bands that a radio can support for prolific coverage. For example, there are over 30 LTE Bands that a radio may be asked to support if the radio is to provide ubiquitous coverage for a mobile device. While some of the LTE Bands overlap one another, there are numerous gaps between the bands as well. A multi-band approach to the antenna's frequency response provides a unique and novel radiating structure to support the numerous LTE bands.

According to some advantageous implementations, an antenna assembly including: a front cover; a back cover, the back cover configured to be coupled to the front cover; at least two PCB bases positioned between the front cover and the back cover, the PCB base including a ground plane; a first multi-band antenna element formed on each PCB base of the two PCB bases, the first multi-band antenna element including: one or more first low-band radiating elements; one or more first mid-band radiating elements; and one or more first high-band radiating elements; and a second multi-band antenna element formed on each PCB base of the two PCB bases, the second multi-band antenna element including: one or more second low-band radiating elements; one or more second mid-band radiating elements; and one or more second high-band radiating elements.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present disclosure in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1A:
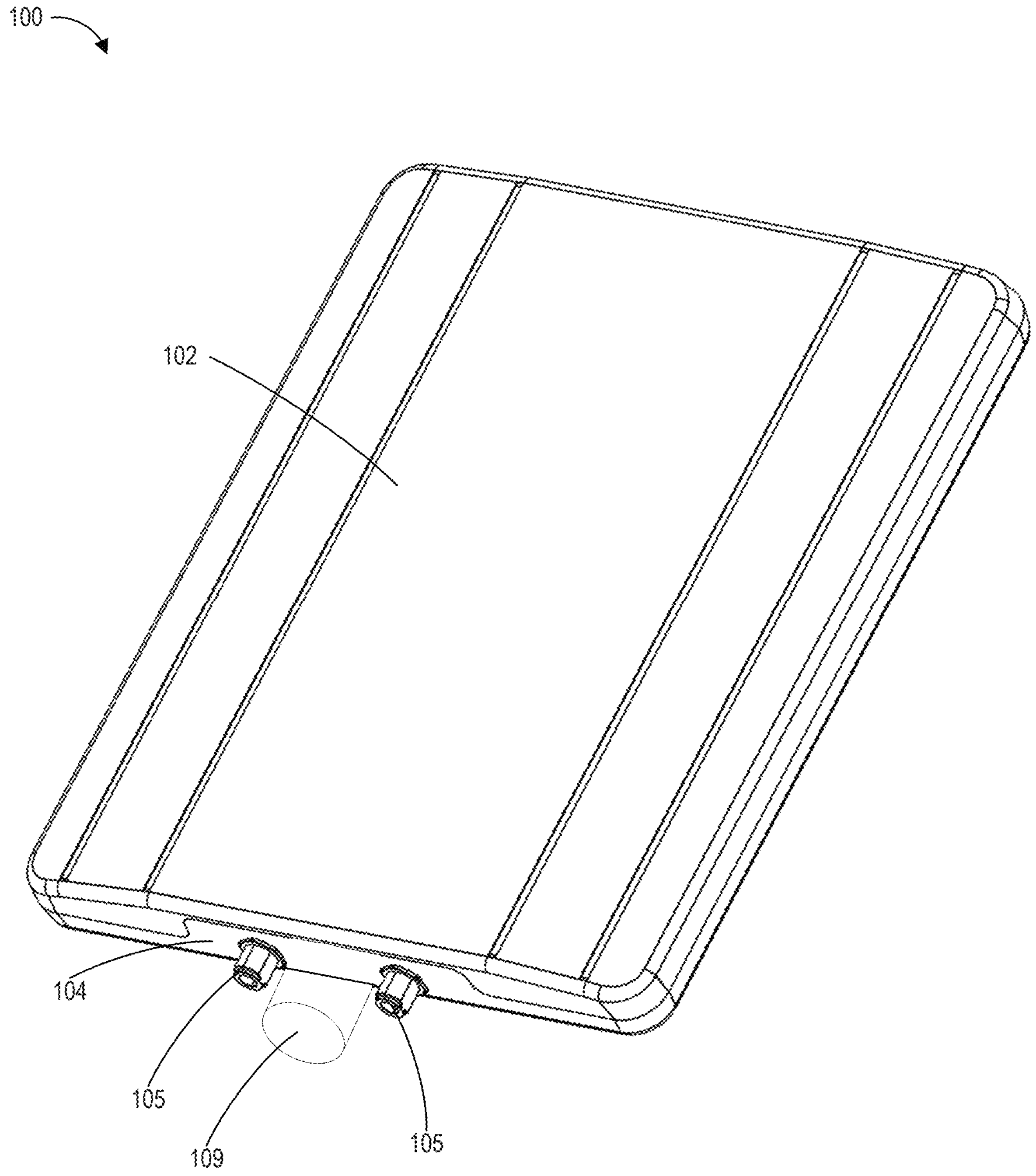
FIG. 1A illustrates a front perspective view of an antenna assembly, in accordance with some aspects of this disclosure.
Figure 1C:
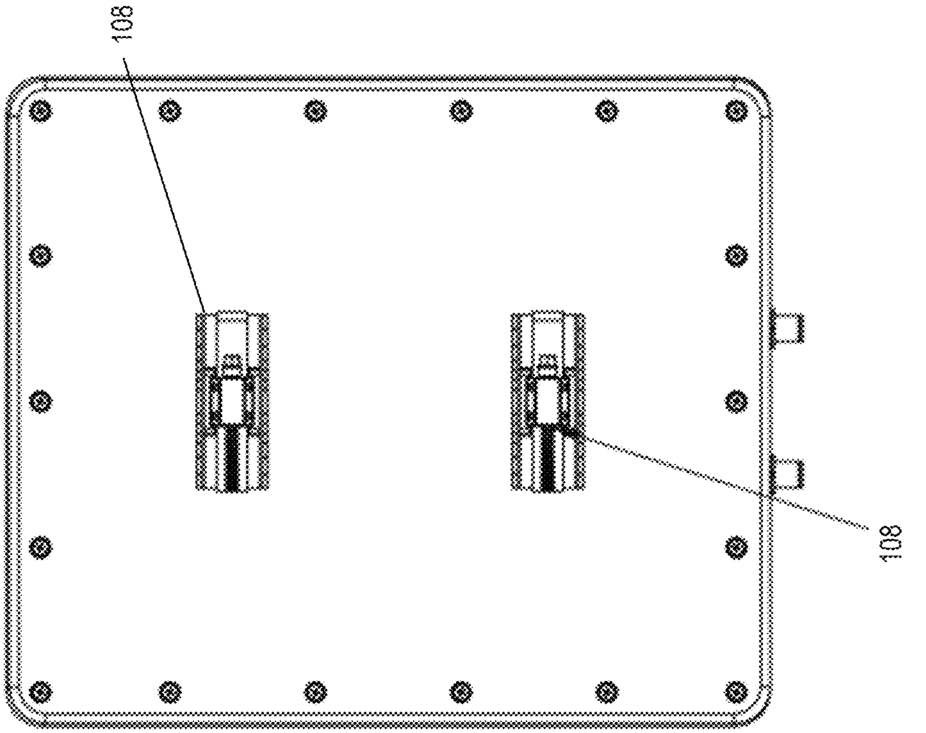
FIGS. 1B, 1C, 1D, 1E illustrate various views of the antenna assembly of FIG. 1A in accordance with some aspects of this disclosure.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative implementations of the preferred embodiments are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present disclosure overcomes problems commonly associated with traditional antenna systems.

The system and method will be understood, both as to its structure and operation, from the accompanying drawings, taken in conjunction with the accompanying description. Several implementations of the system may be presented herein. It should be understood that various components, parts, and features of the different implementations may be combined together and/or interchanged with one another, all of which are within the scope of the present application, even though not all variations and particular implementations are shown in the drawings. It should also be understood that the mixing and matching of features, elements, and/or functions between various implementations is expressly contemplated herein so that one of ordinary skill in the art would appreciate from this disclosure that the features, elements, and/or functions of one implementation may be incorporated into another implementation as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary implementation, however, alternate implementations having scaled and proportional dimensions of the presented exemplary implementation are also considered. Additional features and functions are illustrated and discussed below.

4×4 Antenna Assembly

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIGS. 1A, 1B, 1C, 1D, 1E, 1F, 1G, 1H, 1I, 1J, 1K, 1L, 1M, 1N, 1O, various views of an antenna assembly 100 is illustrated in accordance with an implementation of the present disclosure. As illustrated in FIG. 1A, the antenna assembly includes a front cover 102 (may be referred to herein as "first cover" or collectively with back cover 104 as "covers"), a back cover 104 (may be referred to herein as "second cover" or collectively with front cover 102 as "covers"), cable connectors 105, and a mounting pole 109. In some implementations, the antenna assembly 100 may be used in a wide range of applications. For example, the antenna assembly 100 may provide wireless internet connectivity for a plurality of uses (e.g., data, voice communication, video, and/or the like). In some examples, the antenna assembly 100 can be used for data and voice communication. The antenna assembly 100 can be used as a 4G and/or 5G antenna. In some cases, the antenna assembly 100 can be used in enterprise network investing in high-capacity throughput and high data speeds. In some cases, the antenna assembly 100 can be used in factory automation, IoT application, retail, enterprise, and/or the like.

In some implementations, the antenna assembly 100 can include a radiating portion (such as multi-element multiband antenna 106). The radiating portion may include an omni-directional (or directional) antenna. In some examples, the antenna assembly 100 may provide radio frequency communication capabilities to user devices within a distance from the antenna assembly 100, for example, a wireless last mile. For example, the antenna assembly 100 can interface with fixed modem locations for the wireless last mile solutions. The antenna assembly 100 can include at least one radiating element. For example, the radiating element can include a 2×2 single-input/single-output (SISO), 4×4 SISO, 8×8 SISO cellular, and/or any combination of various scales of SISO antennas (for example, greater than 8×8) omni-directional antenna, a 2×2 multi-input/multi-output (MIMO), 4×4 MIMO, 8×8 MIMO cellular, and/or any combination of various scales of MIMO antennas (for example, greater than 8×8) omni-directional antenna. In some cases, the radiating element can include hardware configurations for multi-band frequency operations. For example, the hardware configurations can include capabilities in at least the C-band.

The antenna assembly 100 can include the front cover 102 and the back cover 104. The front cover 102 can be configured to be removably coupled to the back cover 104. The front cover 102 may be generally rectangularly shaped. In some cases, the front cover 102 can have rounded corners and/or sides. In some examples, the front cover 102 may have a length and width having a ration 1:1. In some cases, the length to width ratio may be between about 1:1 to 10:1, between about 2:1 to 9:1, between about 3:1 to 8:1, between about 4:1 to 7:1, between about 5:1 to 6:1, or any value or range between any of these values or ranges or any value or range bounded by any combination of these values, although values or ranges outside these values or ranges can be used in some cases. In some cases, the length to width ratio may be between about 1:1 to 1:10, between about 1:2 to 1:9, between about 1:3 to 1:8, between about 1:4 to 1:7, between about 1:5 to 1:6, or any value or range between any of these values or ranges or any value or range bounded by any combination of these values, although values or ranges outside these values or ranges can be used in some cases. In some examples, the front cover 102 may have a uniform height, or in some cases, tapered height. For example, the front cover 102 may have smallest height closest to the edge of the front cover 102 and a maximum height in a central region of the front cover 102. In some examples, the central region forms a region from a first edge to a second edge having a uniform height and tapers from the central region to a third edge and a fourth edge.

The back cover 104 can be configured to be removably coupled to the front cover 102. The back cover 104 may be generally rectangularly shaped. In some cases, the back cover 104 can have rounded corners and/or sides. The back cover 104 may include a ribbed internal portion. In some examples, the front cover 102 may have a length and width having a ration 1:1. In some cases, the length to width ratio may be between about 1:1 to 10:1, between about 2:1 to 9:1, between about 3:1 to 8:1, between about 4:1 to 7:1, between about 5:1 to 6:1, or any value or range between any of these values or ranges or any value or range bounded by any combination of these values, although values or ranges outside these values or ranges can be used in some cases. In some cases, the length to width ratio may be between about 1:1 to 1:10, between about 1:2 to 1:9, between about 1:3 to 1:8, between about 1:4 to 1:7, between about 1:5 to 1:6, or any value or range between any of these values or ranges or any value or range bounded by any combination of these values, although values or ranges outside these values or ranges can be used in some cases. In some examples, the back cover 104 may have a uniform height, or in some cases, tapered height. For example, the back cover 104 may have smallest height closest to the edge of the back cover 104 and a maximum height in a central region of the back cover 104. In some examples, the central region forms a region from a first edge to a second edge having a uniform height and tapers from the central region to a third edge and a fourth edge.

One or both of the front cover 102 and back cover 104 can be made of non-conductive materials. For example, the covers 102, 104 may not be made of metal. In some examples, the covers 102, 104 can be made of plastic, fiberglass, carbon fiber, and/or the like materials that allow RF signals to pass through. In some implementations, the front cover 102 may be transparent to radiation from the multi-element multi-band antenna 106 and may serve as an environmental shield for the internal components of antenna assembly 100.

In some implementations, the covers 102, 104 may interface with each other to form a housing. In this way, the covers 102, 104 can protect and/or provide mechanical support for the internal components of the antenna assembly 100 (e.g., the multi-element multi-band antenna 106). For example, as discussed herein, the covers 102, 104, when interfaced to form the housing, may support the multi-element multi-band antenna 106. A top edge of the back cover 104 can be configured to interface with a bottom edge of the front cover 102. Other shapes are possible for the covers 102, 104. In some examples, the front cover 102 and back cover 104, when coupled to form the housing, may define an internal compact volume. The front cover 102 may include a plurality of front fastener holes (not shown), which may extend into the front cover 102. In some implementations, the fastener holes may be tapered. In some implementations, the front fastener holes may be threaded. These plurality of fastener holes may be aligned with back cover holes of the back cover 104 in the assembled configuration, and fasteners can be positioned within the fastener holes and the back cover holes to secure the front cover 102 and the internal components of the antenna assembly 100 to the back cover 104.

Figure 1B:
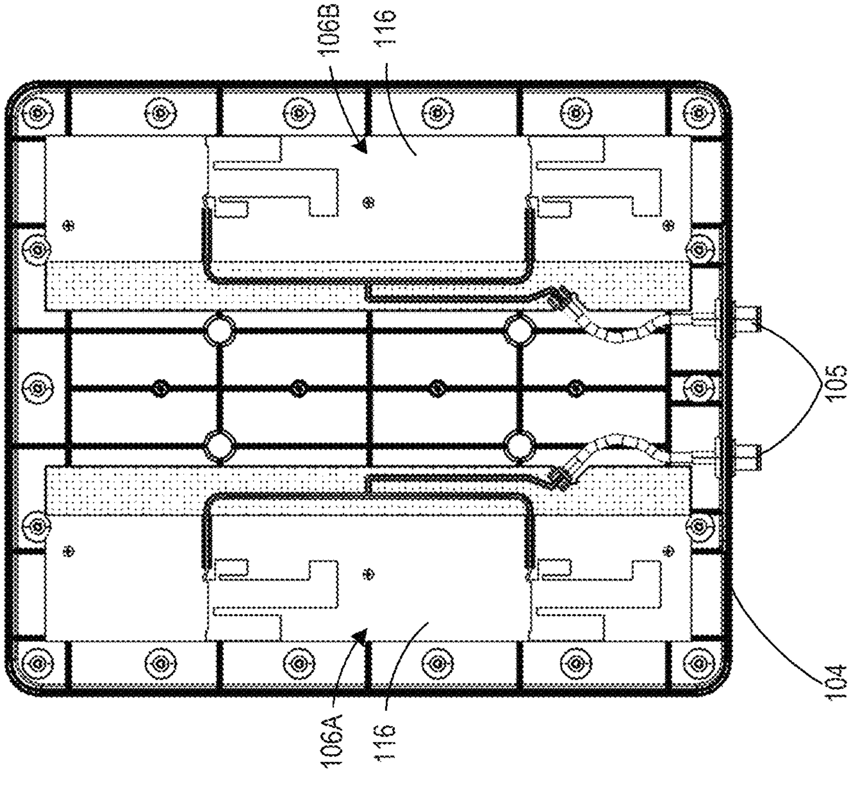
Figure 1E:
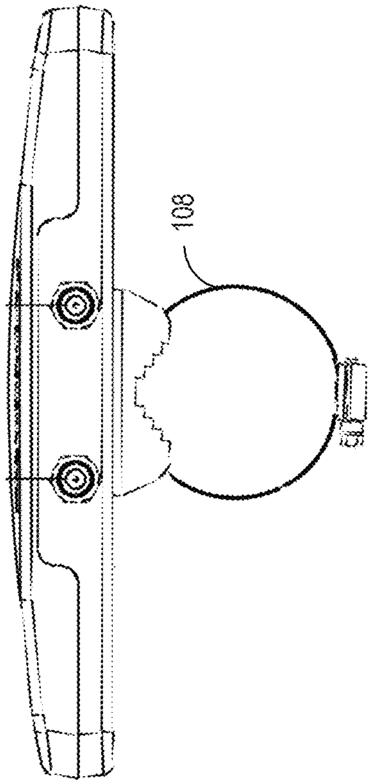
Figure 1D:
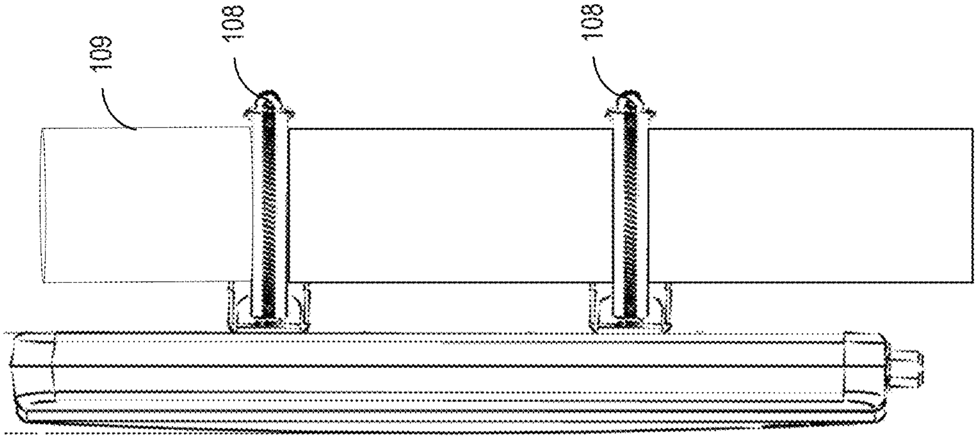
Figure 1F:
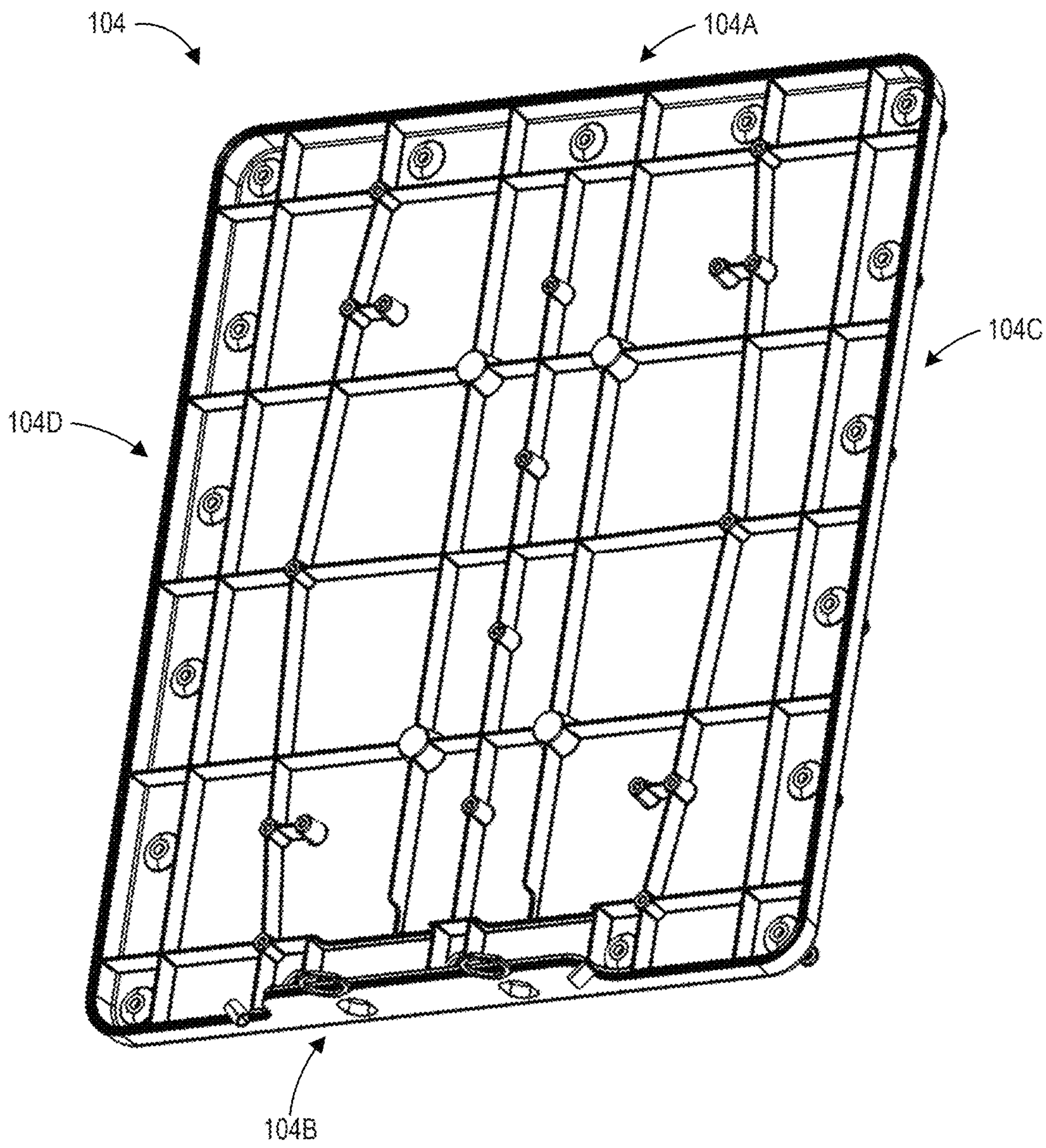
FIGS. 1F, 1G, 1H, 1I, 1J illustrate various views of a back cover of the antenna assembly in accordance with some aspects of this disclosure.
Figure 1G:
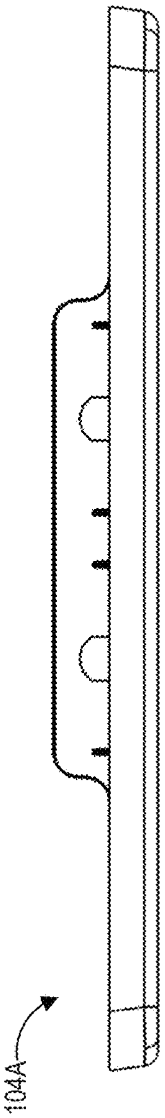
Figure 1H:
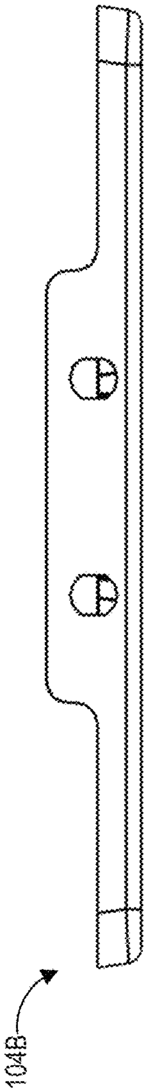
Figure 1I:
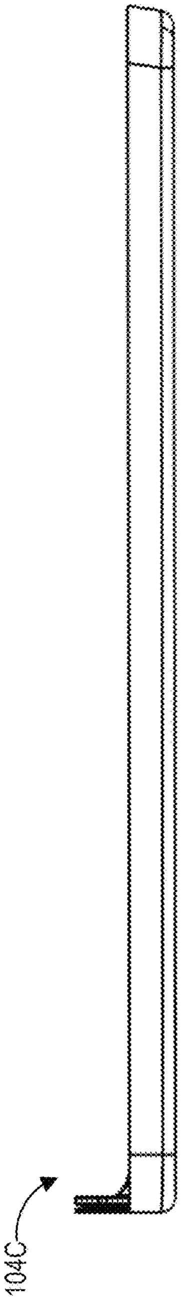
Figure 1J:
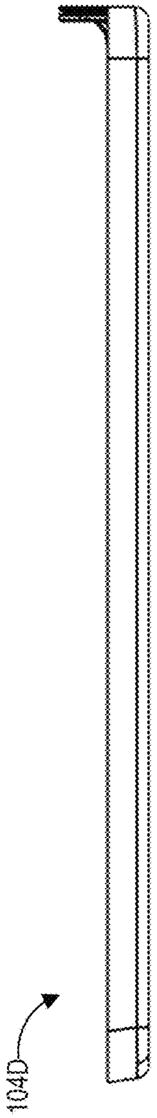
Figure 1K:
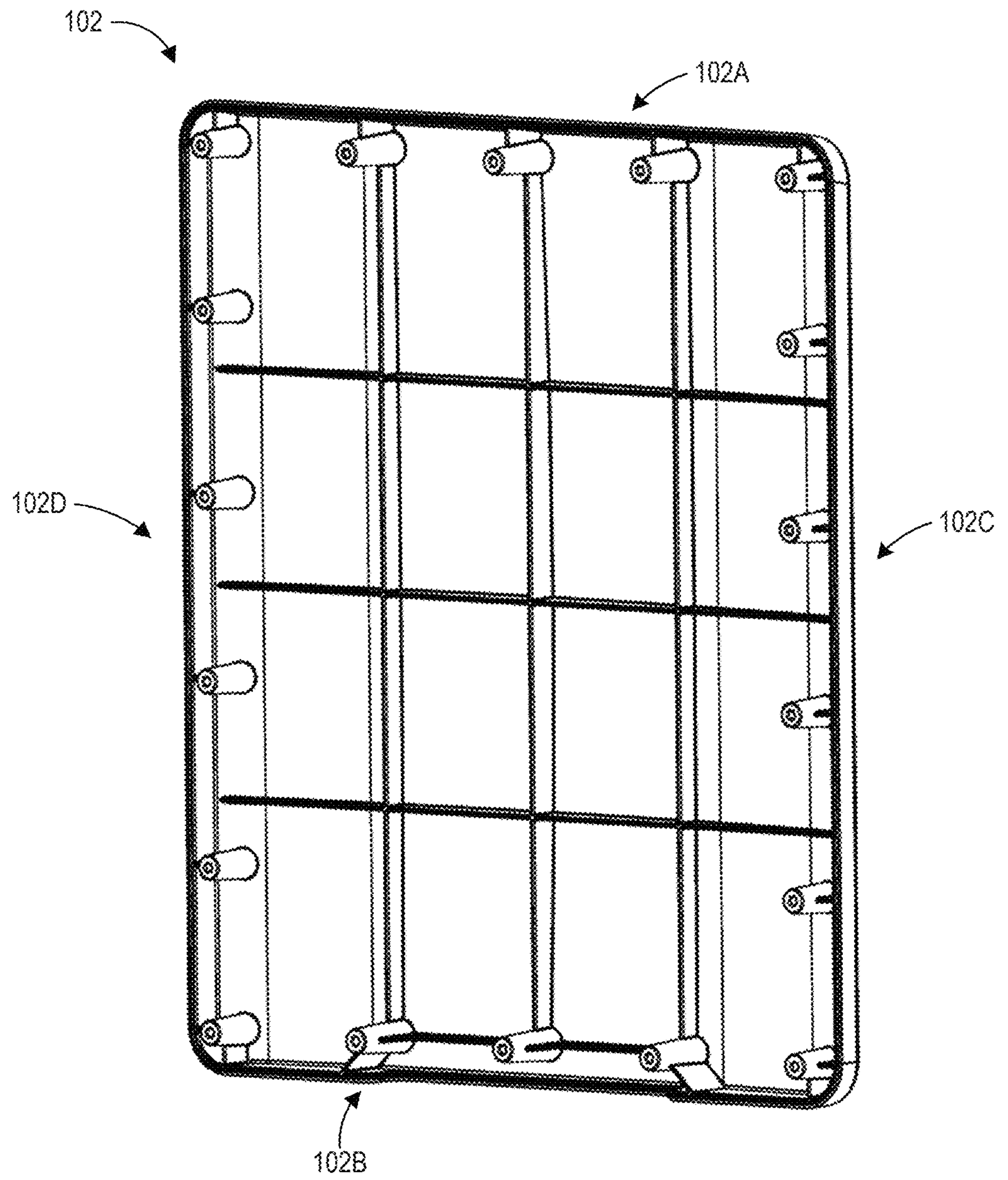
FIGS. 1K, 1L, 1M, 1N, 1O illustrate various views of a front cover of the antenna assembly in accordance with some aspects of this disclosure.
Figure 1L:
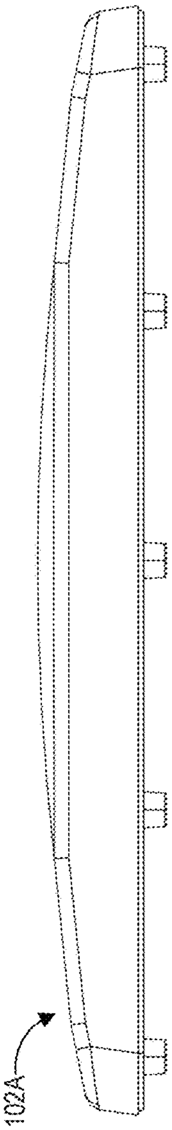
Figure 1M:
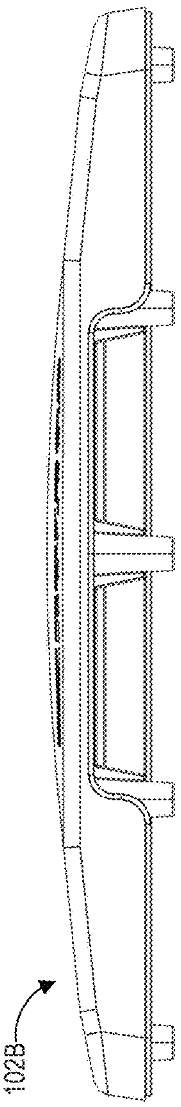
Figure 1N:
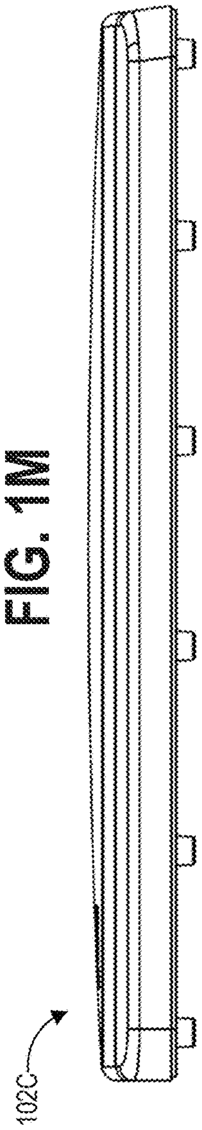
Figure 1O:
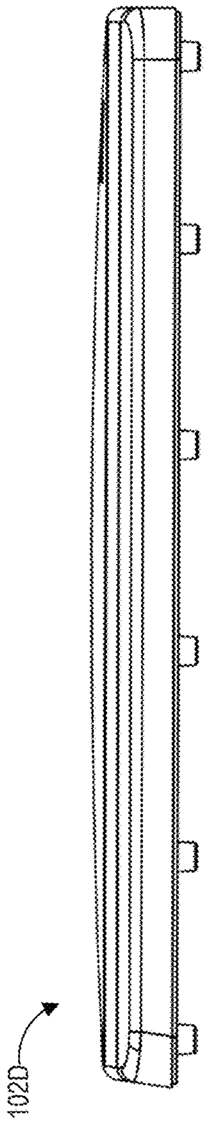

With reference to FIG. 1B, the antenna assembly 100 includes the front cover 102, the back cover 104, cable connectors 105, multi-element multi-band antenna 106, attachment portion(s) 108, the mounting pole 109, and printed circuit board (PCB) base(s) 116.

In some implementations, the cable connectors 105 may provide radio frequency energy to one or more transmission lines. For example, the cable connectors 105 may provide broadband feed network signal to the radiating elements of the antenna assembly 100. In some examples, the cable connectors 105 may couple to coaxial cables. The coaxial cables can extend from the cable connectors 105 to a connection interface (such as connection interface 124), as described herein.

In some implementations, the multi-element multi-band antenna 106 may provide radio frequency energy across various frequency bands. In some examples, the multi-element multi-band antenna 106 may have various operating frequencies. In some examples, the operating frequency range may include between approximately 500 megahertz (MHz) to 8.0 gigahertz (GHz). In some examples, the operating frequency range is between approximately 1.0 GHz and approximately 7.0 GHz, between approximately 2.0 GHz and approximately 6.0 GHz, between approximately 3.0 GHz and approximately 5.0 GHz, between approximately 4.0 GHz and approximately 4.0 GHz, or any value or range between any of these values or ranges or any value or range bounded by any combination of these values, although values or ranges outside these values or ranges can be used in some cases. In some cases, the multi-element multi-band antenna 106 can have optimal performance when operating at a frequency range of 600 MHz to 4.0 GHz. In some cases, the multi-element multi-band antenna 106 can have optimal performance when operating at a frequency range of 600 MHz to 6.0 GHz. In other implementations, other operating frequency ranges are possible.

In some implementations, the attachment portions 108 may couple to the back cover 104. The attachment portions 108 can couple the antenna assembly 100 to the mounting pole 109. For example, the attachment portions 108 may mount the antenna assembly 100 to the mounting pole 109. The attachment portion 108 may include various forms, types, and materials. For example, the mounting portion 108 may be worm drive clamps with brackets. In some examples, the type of the attachment portion 108 included in the antenna assembly 100 can vary based on the intended mounting manner and location. Although two attachment portions 108 are shown in FIG. 1B, the antenna assembly 100 can include any number of attachment portions 108. The attachment portions 108 can be coupled to a back side of the back cover 104 using any conventional fastening means. For example, as illustrated in FIG. 1B, the attachment portions 108 can be fixed to the back cover 104 using fasteners. The attachment portions 108 can include brackets configured to be coupled to the mounting pole 109. In some examples, the attachment portion 108 could be one or more worm gear clamps.

In some implementations, the mounting pole 109 is optional and may not form a portion of the antenna assembly 100. In some examples, the mounting pole 109 may include a ground plane of any form, such as a client ground plane (for example, a conductive object to which the antenna assembly 100 is mounted). In this way, the antenna assembly 100 can couple to a client ground plane (such as a mounting pole) with the attachment portions 108. The client ground plane may be in the form of conducting surfaces, such as on customer premise equipment. Those skilled in the art would understand that the nature of the deployment of the antenna assembly 100 will change slightly in the deployed performance based on type of structure the antenna assembly 100 is attached to as well as the surroundings in which it is deployed. In some implementations, the client ground plane is not required and may not form a portion of the antenna assembly 100.

In some implementations, the PCB base 116 may provide structural support to the antenna assembly 100. In some examples, the PCB bases 116 may support the multi-element multi-band antennas 106. For example, the multi-element multi-band antennas 106 can be formed on the PCB bases 116. The PCB bases 116 may provide structure for radiating elements (may also be referred to herein as "portions") of the multi-element multi-band antennas 106. For example, the radiating elements of the multi-element multi-band antennas 106 can be conductive material (e.g., copper) that can be etched into the structure of the PCB bases 116. The PCB bases 116 can be housed within the antenna assembly 100 (e.g., between the front cover 102 and the back cover 104). In some cases, the PCB bases 116 may be fiberglass reinforced with epoxy (e.g., FR4) and/or a microwave grade PCB material. As illustrated, the antenna assembly 100 includes one or more PCB bases 116. In some examples, the antenna assembly 100 has more (or less) than two PCB bases.

In some examples, the front cover 102 and/or the back cover 104 may couple to the PCB bases 116. For example, the back cover 104 may position the PCB bases 116 along internal ribbing of the back cover 104. In this way, the internal ribbing can provide separation between the multi-element multi-band antenna 106 and the back cover 104. In some examples, the front cover 102 and back cover 104 can provide electrical isolation between the fasteners and the electrically conductive surfaces of the PCB bases 116.

Figure 2:
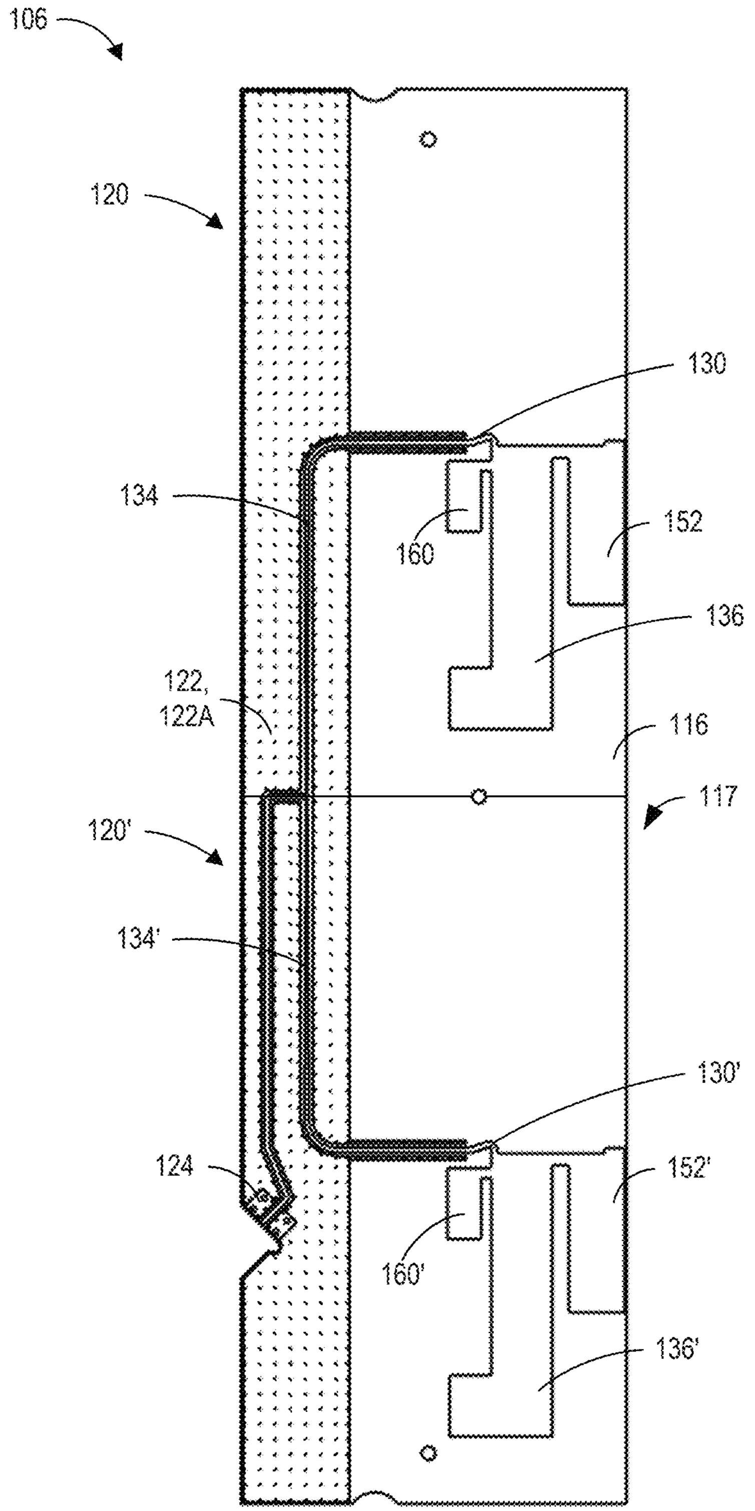
FIG. 2 illustrates a top perspective view of a PCB base and multiband antenna elements of the antenna assembly of FIG. 1A, in accordance with some aspects of this disclosure.
Figure 3:
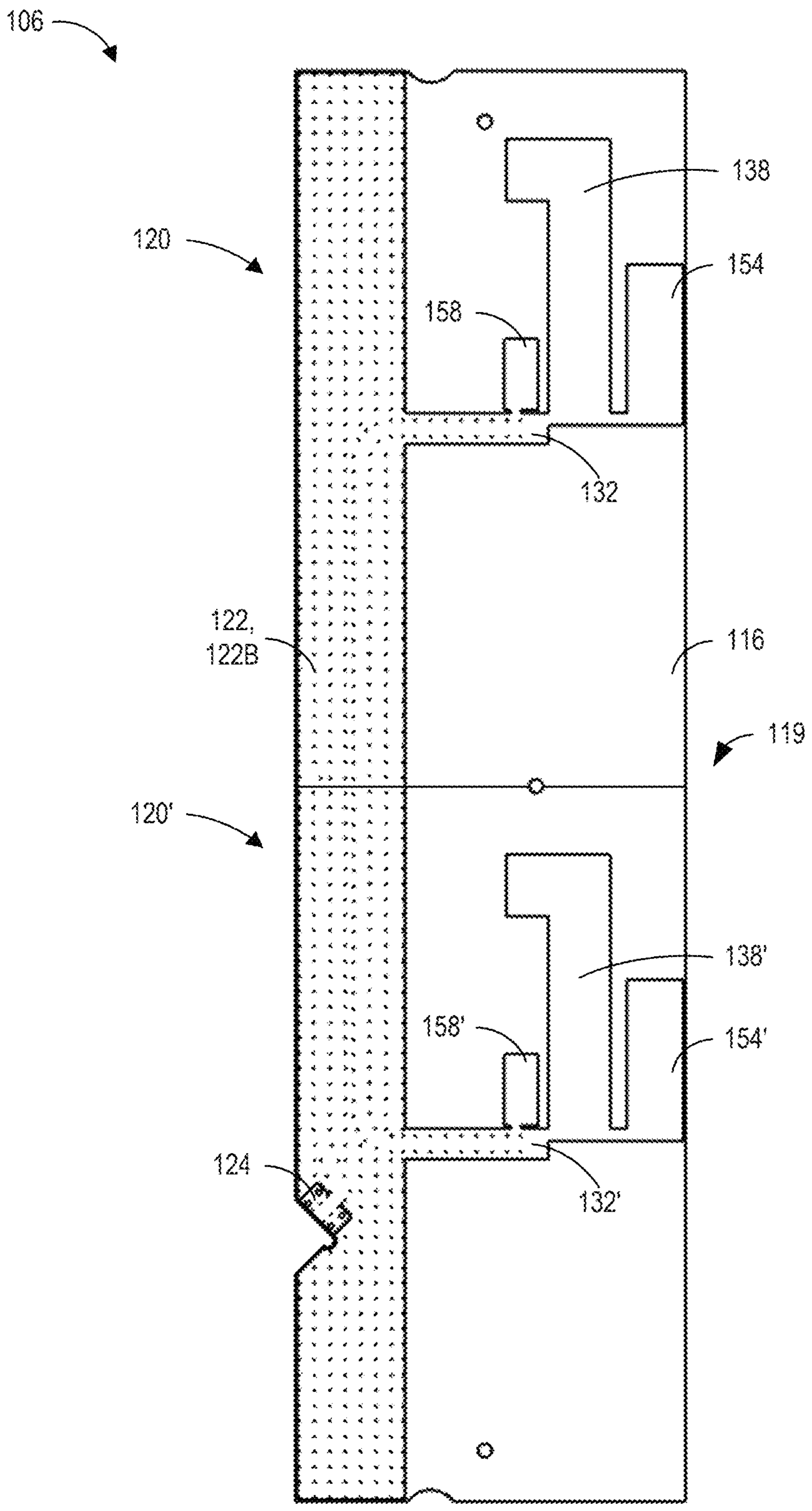
FIG. 3 illustrates a top perspective view of a PCB base and multiband antenna elements of the antenna assembly of FIG. 1A, in accordance with some aspects of this disclosure.
Figure 4:
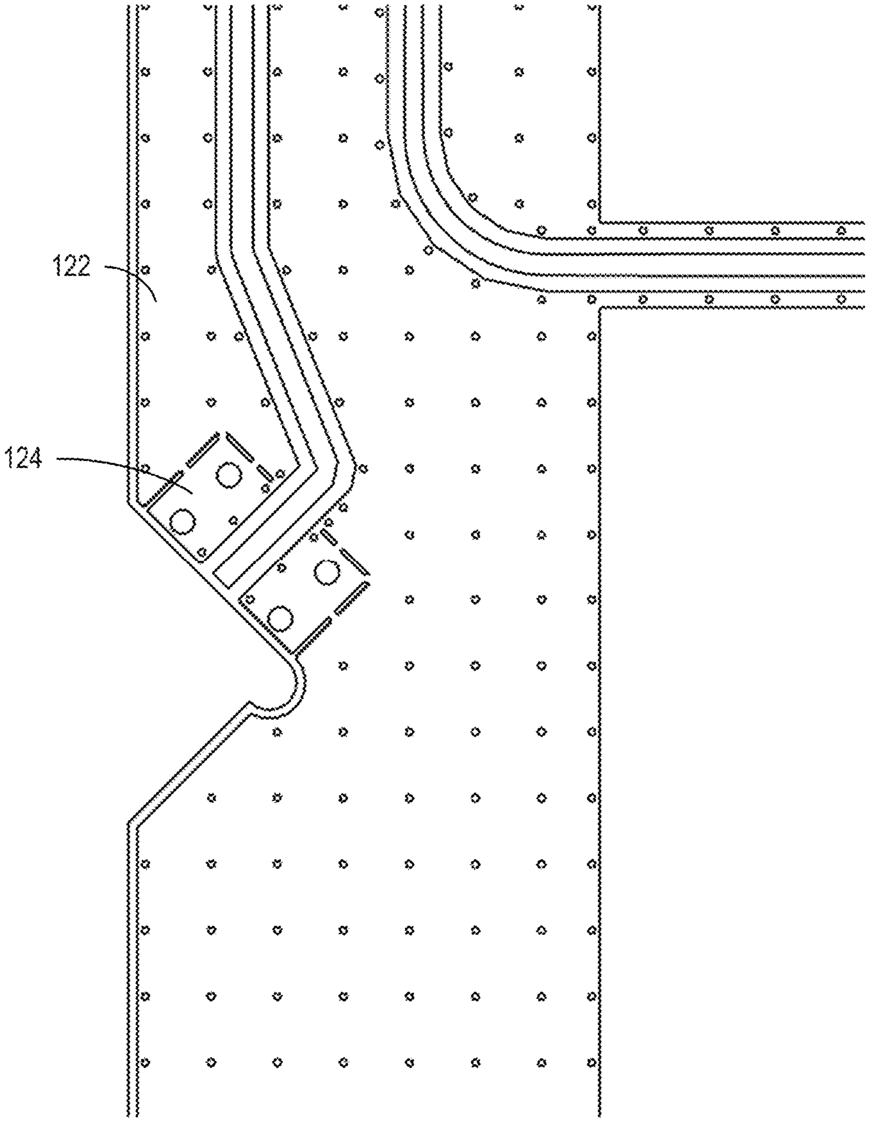
FIG. 4 illustrates a perspective view of a connection interface of the antenna assembly of FIG. 1A, in accordance with some aspects of this disclosure.

FIGS. 2, 3, and 4 illustrate views of the multi-element multi-band antenna 106. The multi-element multi-band antenna 106 includes a PCB base 116, a first multiband antenna element 120, a second multiband antenna element 120', a ground plane 122 (may also be referred to herein as the "ground reference 122"), a connection interface 124, feed points 130, 130', baluns 132, 132', microstrip lines (may also be referred to herein as "feed line") 134, 134', first low-band radiating elements (may also referred to herein as the "first low-band arm(s)") 136, 136', second low-band radiating elements (may also referred to herein as the "second low-band arm(s)") 138, 138', first mid-band arms 152, 152', second mid-band arms 154, 154', first high-band radiating elements (may also be referred to herein as the "first high-band arm(s)") 158, 158', and second high-band radiating elements (may also be referred to herein as the "second high-band arm(s)") 160, 160'.

The antenna assembly 100 can include more than one multi-element multi-band antenna (for example, as illustrated in FIG. 1B). In some examples, the antenna assembly 100 may include the multi-element multi-band antennas 106A, 106B each positioned lengthwise along edges of the front cover 102 and back cover 104 within the internal compact volume. For example, the multi-element multi-band antennas 106A may secure within the internal compact volume along a first edge with a lateral axis parallel to the mounting pole 109. A second multi-element multi-band antennas 106B may secure along a second edge with a lateral axis parallel to the mounting pole 109. In this way, lateral axes of each of the multi-element multi-band antennas 106A, 106B each are parallel. In some examples, the first edge and the second edge are opposite edges. In this way, the multi-element multi-band antennas 106A, 106B are opposite each other within the internal compact volume.

Each of the multi-element multi-band antennas 106A, 106B can be positioned between the front cover 102 and the back cover 104 so the multi-element multi-band antennas 106A, 106B are positioned on opposite sides of the attachment portion 108 and/or the mounting pole 109. The antenna assembly 100 is configured so the attachment portion 108 and/or the mounting pole 109 act like reflectors for the multi-element multi-band antennas 106A, 106B.

In some implementations, the PCB base 116 can include a front side 117 (may also be referred to herein as "first side") and a back side 119 (may also be referred to herein as "second side"). In some examples, the PCB base 116 may include one or more multiband antenna elements. In illustrated in FIGS. 2-3, the PCB base 116 includes the first multiband antenna element 120 and the second multiband antenna element 120'. In some examples, at least some portions of the multiband antenna elements 120, 120' are formed on the front side 117 of the PCB base 116 and some portions of the multiband antenna elements 120, 120' are formed on the back side 119 of the PCB base 116 (as shown in FIG. 3). In some examples, the entire first multiband antenna element 120 and/or the entire second multiband antenna element 120' could be formed on either the front side 117 or the back side 119 of the PCB base 116.

The multi-element multi-band antenna 106 can include a ground plane 122 (may also be referred to herein as the "ground reference 122"). The ground plane 122 can include a first ground plane 122A on the front side 117 of the PCB base 116 and a second ground plane 122B on the back side 119 of the PCB base 116. The ground plane 122 can extend across the first multiband antenna element 120 and the second multiband antenna element 120'. The ground plane 122 may serve as the ground reference for at least the first multiband antenna element 120 and the second multiband antenna element 120'. The ground plane 122 can include the connection interface 124 (as shown in more detail in FIG. 4).

The connection interface 124 can be configured to connect the first multiband antenna element 120 and the second multiband antenna element 120' to a coaxial cable. For example, the coaxial cable can be mechanically and/or electrically coupled to the connection interface 124 (e.g., using solder). Where the first multiband antenna element 120 and second multiband antenna element 120' are formed on both sides 117, 119 of the PCB base 116, the coaxial cable may be soldered to both sides 117, 119 of the PCB base 116. For example, the connection interface 124 can be formed on both sides 117, 119 of the PCB base 116. The ground planes 122A, 122B may provide a ground reference for the antenna assembly 100. In some cases, the connection interface 124 may provide thermal relief for the ground planes 122A, 122B. For example, dimensions, materials, structure, or other aspect of the connection interface 124 may provide thermal dissipation. In some cases, the connection interface 124 may provide thermal resistance. For example, the connector can heat up to soldering temperatures without the heat traveling throughout the entire PCB. According to some implementations, the ground plane can have voids in it to keep the heat from traveling through what would be a contiguous copper surface.

The first feed point 130 can couple antenna elements on the front side 117 with antenna elements on the back side 119. For example, the first feed point 130 can provide energy excitation to the mid-band arms 152, 154. The impedance of the first feed point 130 can vary, depending on the application of the antenna assembly 100. In one example, the first feed point 130 can have an impedance of 50-ohms. As explained herein, the dipole arms of the first multiband antenna element 120 can have matching polarity (e.g., matching extension in the positive and/or negative Z-direction such that the polarity of all arms is the same for all bands). In this example, the first balun 130 extends to the radiating elements of the first multiband antenna element 120 on front side 117 of the PCB base 116 and the first balun 132 extends to the first multiband antenna element 120 on the back side 119 of the PCB base 116.

In some implementations, the microstrip lines 134, 134' can be on the back side 119 of the PCB base 116. The coaxial cable may include a center conductor attached to a microstrip line that then attaches to a junction for microstrip lines 134, 134'. The ground plane 122A can provide electrical grounding for the microstrip lines 134, 134'. In some examples, the ground plane 122A and the microstrip lines 134, 134' can form the microstrip transmission line for the first multiband antenna element 120 and the second multiband antenna element 120'. The microstrip lines 134, 134' may extend from and is coupled to the connection interface 124. The two distinct conducting surface that form the microstrip transmission line (e.g., the microstrip lines 134, 134' and the ground plane 122A) can be used together with balun pairs 130, 132, and 130', 132' to electrically excite the pairs of dipole arms that make up the first multiband antenna element 120 and the second multiband antenna element 120', as explained herein.

The first multiband antenna element 120 can include a number of radiating elements (may also be referred to herein as "arms" and/or "dipole arms). For example, the first multiband antenna element 120 can include one or more high-band arms, one or more mid-band arms, and/or one or more low-band arms. In the illustrated embodiment, the first multiband antenna element 120 includes pairs of dipole arms for high-band, mid-band, and low-band radiation.

As shown, in the illustrated example, the first multiband antenna element 120 can include a first low-band radiating element 136 and a second low-band radiating element 138 (may also be referred to herein as the first low-band arm 136 and the second low-band arm 138 respectively). The low-band arms 136, 138 can be configured for low band radiation (e.g., an operating frequency less than approximately 1 GHz). In some examples, the low-band operating frequency range may include between approximately 0 MHz to 1.0 gigahertz (GHz). In some examples, the operating frequency range is between approximately 100 MHz and approximately 900 MHz, between approximately 200 MHz and approximately 800 MHz, between approximately 300 MHz and approximately 700 MHz, between approximately 400 MHz and approximately 600 MHz, between approximately 500 MHz and approximately 1000 MHz, or any value or range between any of these values or ranges or any value or range bounded by any combination of these values, although values or ranges outside these values or ranges can be used in some cases. The low-band arms 136, 138 can form a single dipole of the first multiband antenna element 120 (e.g., the driven element and a counterpoise). In the illustrated example, the first low-band radiating element 136 is formed on the front side 117 of the PCB base 116 and the second low-band radiating element 138 is formed on the back side 119 of the PCB base 116. However, this arrangement is not required, but can provide a convenient manner of reducing the number of plated through holes include in the PCB base 116. The first low-band radiating element 136 can be coupled to the first balun 132. The first low-band radiating element 136 can be shaped to provide low-band radiation. For example, the first low-band radiating element 136 may be rectangular, L-shaped, square, or another shape to provide low-band radiation. For example, the first low-band radiating element 136 can include a bend along the radiating element. The bend may be an approximately 90-degree bend to form the L-shape. The first low-band radiating element 136 is bent at a location where the bend still allows for acceptable performance of the low-band radiation characteristics, and helps with the higher order modes to promote the radiation in the mid-band and high-band radiation properties of the other arms (portions) and may also reduce the mutual coupling between the dipole comprised of arms 136 and 138 and the dipole comprised of arms 136' and 138'.

The second low-band radiating element 138 can be coupled to the ground plane of microstrip line 134. The second low-band radiating element 138 can be shaped to provide low-band radiation. For example, the second low-band radiating element 138 may be rectangular, L-shaped, square, or another shape to provide low-band radiation. For example, the second low-band radiating element 138 can include a bend along the radiating element. The bend may be an approximately 90-degree bend to form the L-shape. The second low-band radiating element 138 is bent at a location where the bend still allows for acceptable performance of the low-band radiation characteristics and helps with the higher order modes to promote the radiation in the mid-band and high-band radiation properties of the other arms (portions). The second low-band radiating element 138 can be a mirror image of the second low-band radiating element 136. The combination of the first low-band radiating element 136 and second low-band radiating element 138 can be form a C-shape (or backwards C-shape).

The tuning of the radiating elements of the first multiband antenna element 120 can be achieved by balancing several factors. These factors can include adjusting one or more of: the width of the balun 132, the microstrip line 134, the offset of the first balun 132 relative to the microstrip line 134 on the PCB base 116 (e.g., in the Z-direction), the spacing of the first balun 132 relative to the microstrip line 134 through the PCB base 116 (e.g., in the X-direction), the dielectric constant ("DK") of the PCB base 116, the geometry of the individual arms of the first multiband antenna element 120 and their spacing relative to each other, the feed impedance, the space from the ground planes 122A, 122B for the feed transmission lines, and/or the like.

The first multiband antenna element 120 can include one or more mid-band radiating elements (may also be referred to herein as "arms" and/or "dipole arms). In the illustrated example, the first multiband antenna element 120 can include a first mid-band radiating element 152 and a second mid-band radiating element 154 (may also be referred to herein as the first mid-band arm 152 and the second mid-band arm 154 respectively). The mid-band arms 152, 154 can be configured for mid band radiation (e.g., radiation approximately between 1700 MHz to 2700 MHz). In some examples, the mid-band operating frequency range may include between approximately 1700 MHz to 2700 MHz. In some examples, the operating frequency range is between approximately 1700 MHz and approximately 2700 MHz, between approximately 1800 MHz and approximately 2600 MHz, between approximately 1900 MHz and approximately 2500 MHz, between approximately 2000 MHz and approximately 2400 MHz, between approximately 2100 MHz and approximately 2300 MHz, between approximately 2200 MHz and approximately 2700 MHz, or any value or range between any of these values or ranges or any value or range bounded by any combination of these values, although values or ranges outside these values or ranges can be used in some cases. The mid-band arms 152, 154 can form a single dipole of the first multiband antenna element 120 (e.g., the driven element and a counterpoise). The first mid-band radiating element 152 and the second mid-band radiating element 154 can be formed on either side of the PCB base 116. In the illustrated example, the first mid-band radiating element 152 is formed on a first side (e.g., the front side 117) of the PCB base 116 and the second mid-band radiating element 154 is formed on a second side (e.g., the back side 119) of the PCB base 116. As noted herein, this arrangement can provide impedance matching and forming of the radiating pattern in the first multiband antenna element 120. For example, on the first side of the PCB base 116, the first low-band radiating element 136 can extend in the positive Z-direction and the first mid-band radiating element 152 also extends in the positive Z-direction. Similarly, the second low-band radiating element 138 extends in the negative Z-direction and the second mid-band radiating element 154 extends in the negative Z-direction. The first mid-band radiating element 152 can be coupled to the first balun 130. The second mid-band radiating element 154 can be coupled to the first balun 132. The first balun 130 can be coupled to the microstrip line 134. As such, the second mid-band radiating element 154 can be a mirror image of the first mid-band radiating element 152. The mid-band radiating elements 152, 154 can be rectangularly shaped. In other implementations, the mid-band radiating elements 152, 154 can be shaped differently.

The first multiband antenna element 120 can include one or more high-band radiating elements/arms/dipole arms. In the illustrated example, the first multiband antenna element 120 can include a first high-band radiating element 158 and a second high-band radiating element 160 (also referred to herein as the first high-band arm 158 and the second high-band arm 160 respectively). The high-band arms 158, 160 can be configured for high band radiation (e.g., radiation approximately above 2700 MHz). In some examples, the operating frequency range is between approximately 2700 MHz and approximately 6000 MHz, between approximately 3200 MHz and approximately 5500 MHz, between approximately 3700 MHz and approximately 5000 MHz, between approximately 4200 MHz and approximately 4500 MHz, between approximately 4350 MHz and approximately 6000 MHz, or any value or range between any of these values or ranges or any value or range bounded by any combination of these values, although values or ranges outside these values or ranges can be used in some cases. The high-band arms 158, 160 can form a single dipole of the first multiband antenna element 120 (e.g., the driven element and is counterpoise). The first high-band radiating element 158 and the second high-band radiating element 160 can be formed on either side of the PCB base 116. In the illustrated example, the first high-band radiating element 158 is formed on the front side 117 of the PCB base 116 and the second high-band radiating element 160 is formed on the back side 119 of the PCB base 116. In this arrangement, the high-band arms 158, 160 are of similar orientation compared to the mid band arms 154 and 152. For example, on the front side 117 of the PCB base 116, the first high-band radiating element 160 extends in the positive Z-direction (e.g., in the same direction as the first low-band radiating element 136) and the first mid-band radiating element 152 extends in the positive Z-direction. Similarly, the second high-band radiating element 158 extends in the negative Z-direction (e.g., in the same direction as the second low-band radiating element 138) and the second mid-band radiating element 154 extends in the negative Z-direction. The first high-band radiating element 158 can be coupled to the first balun 132. The first high-band radiating element 158 can extend in the negative Z-direction from the first balun 132. The second high-band radiating element 160 can be coupled to the first balun 130 The high-band radiating elements 158, 160 can be rectangle shaped. In other implementations, the high-band radiating elements 158, 160 can have different shapes.

In some cases, the high-band arms 158, 160, can be the closest to the ground plane 122A, 122B. Moving in the negative Y-direction from the connection interface 124, the first multiband antenna element 120 can be arranged such that the low-band arms 136, 138 are positioned furthest from the first connection interface 124 in the Y-direction and the high-band arms 158, 160 are the closest to the first connection interface 124, with the mid-band arms 152, 154 between the high-band arms 158, 160 and the low-band arms 136, 138 in the Y-direction. In some examples, the high band radiating portions 158, 158', 160, 160' may connect to the ground plane for the microstrip line 134, 134'. In some cases, the high band radiating portions 158, 158', 160, 160' may connect to one or more of the low-band radiating portions to provide a ground reference.

As noted herein, the multi-element multi-band antenna 106 can include the first multiband antenna element 120 and the second multiband antenna element 120' formed on the PCB base 116. Some features of the second multiband antenna element 120' are similar or identical to features of the first multiband antenna element 120. Thus, reference numerals used to designate the various features or components of the first multiband antenna element 120 are identical to those used for identifying the corresponding features or components of the second multiband antenna element 120', except that the numerical identifiers for the second multiband antenna element 120' include a "prime." Therefore, the structure and description for the various features of the first multiband antenna element 120 and the operation are understood to apply to the corresponding features of the second multiband antenna element 120', except as identified as different as described herein.

The second multiband antenna element 120' differs from the first multiband antenna element 120 in the position and orientation on the PCB base 116. In some implementations, the second multiband antenna element 120' can be a mirror image of the first multiband antenna element 120. In some implementations, the second multiband antenna element 120' can be a translated copy of the first multiband antenna element 120.

In some implementations, the multi-element multi-band antenna 106 can include the first multiband antenna element 120 and the second multiband antenna element 120' formed primarily or entirely on the one side of the PCB base 116 (e.g., the front side 117). However, having the multiband antenna elements 120, 120' formed on both sides of the PCB base 116 can provide certain benefits. For example, forming the multiband antenna elements 120, 120', one on each side of the PCB base 116, can reduce the complexity of the design. For example, the complexity of the baluns 132, 132' and microstrip lines 134, 134' can be reduced such that no crossing of lines occurs in the multiband antenna elements 120, 120'. In another example, having the multiband antenna elements 120, 120' on both sides of the PCB base 116 can provide the benefits of allowing the overall size of the antenna assembly 100 to be reduced. For example, when the multiband antenna elements 120, 120' are formed on one side of the PCB base 116, the size of the PCB base 116 may need to increase, which can cause the overall size of the antenna assembly 100 to increase. Compact antennas are desirable, as such, an antenna assembly 100 with a smaller volumetric profile is often desirable. Additionally, having the multiband antenna elements 120, 120' on both sides of the PCB base 116 can reduce the complexity of the balun.

In some implementations, the microstrip lines 134, 134' can extend from a junction to a microstrip line that then attaches to one connection interface 124 positioned on the ground plane 122 at a positioned closer to the first multiband antenna element 120 than the second multiband antenna element 120'.

In some implementations, the antenna assembly 100 can perform across a variety of operating frequency ranges. For example, the antenna assembly 100 may include components for particular performance in the C-Band, which can span approximately 3.0 GHz to 5.0 GHz. In some examples, the operating frequency range is between approximately 3.0 GHz and approximately 5.0 GHz, between approximately 3.5 GHz and approximately 4.5 GHz, between approximately 3.2 GHz and approximately 4.3 GHz, between approximately 3.5 GHz and approximately 4.2 GHz, or any value or range between any of these values or ranges or any value or range bounded by any combination of these values, although values or ranges outside these values or ranges can be used in some cases. For example, when operating on a 5G cellular network, optimizing the antenna assembly 100 for the C-band can provide a balance between high data speeds and quality coverage. For example, in some cases, the C-band can provide a compromise between higher frequencies used for ultra-fast data transfer (e.g., millimeter-wave bands) and lower frequencies used for broader coverage (e.g., sub-6 GHz bands) in 5G networks. According to some implementations, references to C-band can span from approximately 3.4 GHz to approximately 4.2 GHz. According to some implementations, references to LAA can span from approximately 5 GHz to approximately 7.25 GHz.

EXAMPLE CLAUSES

Various examples of systems relating to an antenna system are found in the following clauses:

Clause 1. An antenna assembly comprising: a front cover; a back cover, the back cover configured to be coupled to the front cover; at least two PCB bases positioned between the front cover and the back cover, the PCB base comprising a ground plane; a first multi-band antenna element formed on each PCB base of the two PCB bases, the first multi-band antenna element comprising: one or more first low-band radiating elements; one or more first mid-band radiating elements; and one or more first high-band radiating elements; and a second multi-band antenna element formed on each PCB base of the two PCB bases, the second multi-band antenna element comprising: one or more second low-band radiating elements; one or more second mid-band radiating elements; and one or more second high-band radiating elements.

Clause 2. An antenna assembly comprising: a front cover; a back cover, the back cover configured to be coupled to the front cover; at least two PCB bases positioned between the front cover and the back cover, wherein a first of the at least two PCB bases comprises a first ground plane, and wherein a second of the at least two PCB bases comprises a second ground plane; a first multi-band antenna element formed on each PCB base of the two PCB bases, the first multi-band antenna element comprising: one or more first low-band radiating elements; one or more first mid-band radiating elements; and one or more first high-band radiating elements; and a second multi-band antenna element formed on each PCB base of the two PCB bases, the second multi-band antenna element comprising: one or more second low-band radiating elements; one or more second mid-band radiating elements; and one or more second high-band radiating elements.

Clause 3. The antenna assembly of Clause 2, wherein the first ground plane is common to both the first multi-band antenna element and the second multi-band antenna element of the first of the at least two PCB bases.

Clause 4. The antenna assembly of Clause 2, wherein the second ground plane is common to both the first multi-band antenna element and the second multi-band antenna element of the second of the at least two PCB bases.

Clause 5. The antenna assembly of Clause 2, wherein the first ground plane is on a top side and a bottom side of the first of the at least two PCB bases.

Clause 6. The antenna assembly of Clause 2, wherein the second ground plane is on a top side and a bottom side of the second of the at least two PCB bases.

Clause 7. The antenna assembly of Clause 2, wherein the ground plane spans across a length of the at least two PCB bases.

Clause 8. The antenna assembly of Clause 2, wherein the first multi-band antenna element shares a feed line with a common terminal point as the second multi-band antenna element.

Clause 9. The antenna assembly of Clause 2, wherein a location of the high-band radiating elements along the at least two PCB bases is closest to the ground plane, with respect to the mid-band radiating elements and the low-band radiating elements.

Clause 10. The antenna assembly of Clause 2, wherein a location of the mid-band radiating elements along the at least two PCB bases is furthest from the ground plane, with respect to the low-band radiating elements and the high-band radiating elements.

Clause 11. The antenna assembly of Clause 2, wherein each of the low-band radiating elements are positioned between the mid-band radiating elements and the high-band radiating elements.

Clause 12. The antenna assembly of Clause 2, wherein the front cover has a non-uniform height across a surface.

Clause 13. The antenna assembly of Clause 12, wherein the non-uniform height has a maximum height along a central region and a minimum height along edges of the front cover.

Clause 14. The antenna assembly of Clause 2, wherein the back cover comprises one or more mounting brackets configured to attach the antenna assembly to a mounting pole.

Clause 15. The antenna assembly of Clause 14, wherein the one or more mounting brackets is configured to adjust a size according to a diameter of the mounting pole.

Clause 16. The antenna assembly of Clause 2, wherein the at least two PCB bases are positioned between the front cover and the back cover with the ground plane of one of the at least two PCB bases facing the ground plane of another of the at least two PCB bases.

Clause 17. The antenna assembly of Clause 2, wherein the antenna assembly further comprises at least one transmission line.

Clause 18. The antenna assembly of Clause 17, wherein the at least one transmission line is configured to provide a broadband signal to at least some of the one or more first low-band radiating elements, mid-band radiating elements, and high-band radiating elements of the first multi-band antenna element.

Clause 19. The antenna assembly of Clause 17, wherein the at least one transmission line is configured to provide a broadband signal to at least some of the one or more first low-band radiating elements, mid-band radiating elements, and high-band radiating elements of the second multi-band antenna element.

Clause 20. The antenna assembly of Clause 17, wherein the at least one transmission line is configured to provide a first broadband signal to at least some of the one or more first low-band radiating elements, mid-band radiating elements, and high-band radiating elements of the first multi-band antenna element, and wherein the at least one transmission line is configured to provide a second broadband signal to at least some of the one or more first low-band radiating elements, mid-band radiating elements, and high-band radiating elements of the first multi-band antenna element.

Clause 21. The antenna assembly of Clause 2, wherein the low-band radiator elements each comprise a bend along a length of the low-band radiator elements, wherein the bend is 90-degrees.

Additional Considerations and Terminology

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise, the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An antenna assembly comprising:

a front cover;

a back cover, the back cover configured to be coupled to the front cover;

one or more PCB bases positioned between the front cover and the back cover, wherein at least a first PCB base of the one or more PCB bases comprises at least a first ground plane;

a first multi-band antenna element formed on the first PCB base, the first multi-band antenna element comprising:

one or more first low-band radiating elements;

one or more first mid-band radiating elements; and one or more first high-band radiating elements; and a second multi-band antenna element formed on the first PCB base, the second multi-band antenna element comprising:

one or more second low-band radiating elements;

one or more second mid-band radiating elements; and one or more second high-band radiating elements.

2. The antenna assembly of claim 1, wherein the first ground plane is common to both the first multi-band antenna element and the second multi-band antenna element of the first PCB base.

3. The antenna assembly of claim 1, wherein the first ground plane is on a top side and a bottom side of the first PCB base.

4. The antenna assembly of claim 1, wherein the first multi-band antenna element and the second multi-band antenna element share a feed line with a common terminal point.

5. The antenna assembly of claim 1, wherein a location of the one or more first high-band radiating elements along the first PCB base is positioned closer to the first ground plane relative to both a location of the one or more first mid-band radiating elements and a location of the one or more first low-band radiating elements.

6. The antenna assembly of claim 1, wherein a location of the one or more first mid-band radiating elements along the first PCB base is positioned further from the first ground plane relative to both a location of the one or more first low-band radiating elements and a location of the one or more first high-band radiating elements.

7. The antenna assembly of claim 1, wherein a location of the one or more first low-band radiating elements along the first PCB base is positioned generally between a location of the one or more first mid-band radiating elements and a position of the one or more first high-band radiating elements.

8. The antenna assembly of claim 1, wherein the one or more first low-band radiating elements each comprise a bend along a length of the one or more first low-band radiating elements, and wherein the bend is about 90-degrees.

9. The antenna assembly of claim 1, wherein the one or more first low-band radiating elements comprises two low-band radiating elements forming a single dipole of the first multi-band antenna element, wherein one of the two first low-band radiating elements is a driven element positioned on a top side of the first PCB base, and wherein one of the two low-band radiating elements is a counterpoise positioned on a bottom side of the first PCB base.

10. The antenna assembly of claim 1, wherein the one or more first mid-band radiating elements comprises two mid-band radiating elements forming a single dipole of the first multi-band antenna element, wherein one of the two mid-band radiating elements is a driven element positioned on a top side of the first PCB base, and wherein one of the two mid-band radiating elements is a counterpoise positioned on a bottom side of the first PCB base.

11. The antenna assembly of claim 1, wherein the one or more first high-band radiating elements comprises two high-band radiating elements forming a single dipole of the first multi-band antenna element, wherein one of the two high-band radiating elements is a driven element positioned on a top side of the first PCB base, and wherein one of the two high-band radiating elements is a counterpoise positioned on a bottom side of the first PCB base.

12. The antenna assembly of claim 1, wherein the one or more first high-band radiating elements comprises two high-band radiating elements forming a single dipole of the first multi-band antenna element, wherein one of the two high-band radiating elements is positioned on a top side of the first PCB base and is connected to a first low-band radiating element of the one or more first low-band radiating elements positioned on the top side of the first PCB base to provide a ground reference, and wherein one of the two high-band radiating elements is positioned on a bottom side of the first PCB base and is connected to the first ground plane directly and/or via a balun.

13. The antenna assembly of claim 1, wherein at least one of the one or more first low-band radiating elements extends from a balun and/or microstrip line in a first direction along a top side of the first PCB base, wherein at least one of the one or more first mid-band radiating elements on the top side of the first PCB base also extends in the first direction, wherein at least one of the one or more first high-band radiating elements on the top side of the first PCB base also extends in the first direction, wherein at least one of the one or more first low-band radiating elements extends from a balun and/or microstrip line in a second direction along a bottom side of the first PCB base, wherein at least one of the one or more first mid-band radiating elements on the bottom side of the first PCB base also extends in the second direction, wherein at least one of the one or more first high-band radiating elements on the bottom side of the first PCB base also extends in the second direction, and wherein the second direction is generally opposite to the first direction.

14. The antenna assembly of claim 1, wherein the one or more first low-band radiating elements comprises two low-band radiating elements forming a single dipole of the first multi-band antenna element, wherein one of the two low-band radiating elements is positioned on a top side of the first PCB base, wherein one of the two low-band radiating elements is positioned on a bottom side of the first PCB base, and wherein the two low-band radiating elements together generally form a C-shaped configuration facing toward the first ground plane.

15. The antenna assembly of claim 1, wherein the antenna assembly further comprises at least one transmission line, wherein the at least one transmission line is configured to provide a broadband signal to at least some of the one or more first low-band radiating elements, the one or more first mid-band radiating elements, and the one or more first high-band radiating elements of the first multi-band antenna element, and wherein the at least one transmission line is configured to provide a broadband signal to at least some of the one or more second low-band radiating elements, the one or more second mid-band radiating elements, and the one or more second high-band radiating elements of the second multi-band antenna element.

16. The antenna assembly of claim 1, wherein a second PCB base of the one or more PCB bases comprises at least a second ground plane, wherein a third multi-band antenna element is formed on the second PCB base, the third multi-band antenna element comprising one or more third low-band radiating elements, one or more first-third mid-band radiating elements, and one or more third high-band radiating elements, and wherein a fourth multi-band antenna element is formed on the second PCB base, the fourth multi-band antenna element comprising one or more fourth low-band radiating elements, one or more fourth mid-band radiating elements, and one or more fourth high-band radiating elements.

17. The antenna assembly of claim 16, wherein at least the first PCB base and the second PCB base are positioned between the front cover and the back cover with the first ground plane of the first PCB base facing the second ground plane of the second PCB base.

18. The antenna assembly of claim 1, wherein the front cover has a non-uniform height across a surface, wherein the non-uniform height has a maximum height along a central region and a minimum height along edges of the front cover, wherein the back cover comprises one or more mounting brackets configured to attach the antenna assembly to a mounting pole, and wherein the one or more mounting brackets are configured to adjust a size according to a diameter of the mounting pole.

19. An antenna assembly comprising:

one or more PCB bases, wherein at least a first PCB base of the one or more PCB bases comprises at least a first ground plane extending along a top side and a bottom side of the first PCB base; and one or more multi-band antenna elements formed on the first PCB base, wherein a first multi-band antenna element of the one or more multi-band antenna elements formed on the first PCB base comprises:

first and second low-band radiating elements forming a single dipole of the first multi-band antenna element, the first and second low-band radiating elements positioned on the top side and the bottom side of the first PCB base, respectively;

first and second mid-band radiating elements forming a single dipole of the first multi-band antenna element, the first and second mid-band radiating elements positioned on the top side and the bottom side of the first PCB base, respectively; and first and second high-band radiating elements forming a single dipole of the first multi-band antenna element, the first and second high-band radiating elements positioned on the top side and the bottom side of the first PCB base, respectively, and wherein the first high-band radiating element on the top side of the first PCB base is connected to the first low-band radiating element positioned on the top side of the first PCB base, wherein the second high-band radiating element on the bottom side of the first PCB base is connected to the first ground plane and/or a balun.

20. The antenna assembly of claim 19, wherein a second multi-band antenna element is formed on the first PCB base, and wherein the second multi-band antenna element is a mirror image of the first multi-band antenna element or a translated copy of the first multi-band antenna element.

21. The antenna assembly of claim 19, wherein a second PCB base of the one or more PCB bases comprises at least a second ground plane extending along a top side and a bottom side of the second PCB base, wherein one or more multi-band antenna elements are formed on the second PCB base, wherein when enclosed within an antenna case, the first PCB base and the second PCB base are positioned and configured such that the one or more multi-band antenna elements formed on the second PCB base are a mirror image or translated copy of the one or more multi-band antenna elements formed on the first PCB base.

* * * * *